(12) United States Patent
Coleman et al.

(10) Patent No.: US 8,924,987 B2
(45) Date of Patent: Dec. 30, 2014

(54) FLAT OR EXTENDED ARCHITECTURE USING AN INTEGRATED APPLICATION AND OPERATING SYSTEM COMPONENT FOR COMPUTING SYSTEMS AND ENVIRONMENTS

(75) Inventors: Victoria S. Coleman, Menlo Park, CA (US); Jean-Pierre Seifert, Tirol (AT); Doreen Cheng, San Jose, CA (US); Xinwen Zhang, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1264 days.

(21) Appl. No.: 12/559,391

(22) Filed: Sep. 14, 2009

(65) Prior Publication Data

US 2010/0131966 A1    May 27, 2010

Related U.S. Application Data

(60) Provisional application No. 61/117,082, filed on Nov. 21, 2008, provisional application No. 61/222,654, filed on Jul. 2, 2009, provisional application No. 61/222,855, filed on Jul. 2, 2009, provisional application No. 61/233,089, filed on Aug. 11, 2009.

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC .................................... *G06F 9/545* (2013.01)
USPC ....................................................... 719/321

(58) Field of Classification Search
None
See application file for complete search history.

(56) References Cited

U.S. PATENT DOCUMENTS

| 5,835,764 | A  | * | 11/1998 | Platt et al. ...................... 718/101 |
| 6,366,297 | B1 | * | 4/2002  | Feagans ......................... 715/736 |
| 6,405,317 | B1 | * | 6/2002  | Flenley et al. ..................... 726/4 |
| 7,865,893 | B1 | * | 1/2011  | Omelyanchuk et al. .......... 718/1 |
| 7,886,021 | B2 | * | 2/2011  | Scheifler et al. ............... 709/217 |
| 8,301,499 | B2 | * | 10/2012 | Moissinac et al. .......... 705/14.64 |
| 2007/0260447 | A1 | * | 11/2007 | Canton ........................... 703/27 |

OTHER PUBLICATIONS

Mike, "Operating Systems Development—Kernel:Basic Concepts Part 2", 2007, BrokenThorn, pp. 1-7.*

(Continued)

*Primary Examiner* — Diem Cao
*Assistant Examiner* — Kacy Verdi
(74) *Attorney, Agent, or Firm* — Kenneth L. Sherman, Esq.; Michael Zarrabian, Esq.; Sherman & Zarrabian LLP

(57) ABSTRACT

In an integrated approach, an integrated application and operating system (IAOS) component integrates at least one computer application program with at least one operating system (OS) function. The IAOS component is an upper level system relative to a lower level system. The lower level system includes an OS operable to perform a reduced set of OS functions. The OS may be optimized for the IAOS component. For example, the OS may be optimized for Web-based and/or Browser-based applications of the IAOS component. In a flat approach, at least one component is an adjacent component in an upper level system, thereby allowing extension of the upper level system to accommodate various needs. An adjacent component can include at least one OS component and/or function not provided by the OS, serve as an interface to another layer and/or the OS, or provide Real-Time Operating System.

25 Claims, 4 Drawing Sheets

(56) References Cited

OTHER PUBLICATIONS

"Benefits of Bondi," Bondi.omtp.org, url: http://bondi.omtp.org/whatisbondi/BENEFITS%20OF%20BONDI/Home.aspx, downloaded on Dec. 29, 2009, 1 page.

"Bondi Architecture & Security Requirements," Version 1.0, May 26, 2009, OMTP Limited, url: http://bondi.omtp.org/1.0/security/BONDI_Architecture_and_Security_v1.0.pdf, 73 pages.

"Bondi," Bondi.omtp.org, url: http://bondi.omtp.org/default.aspx, downloaded on Dec. 29, 2009, 1 page.

"Everex Cloudbook," everexcloudbook.com. url: http://www.everexcloudbook.com/en/home/, downloaded on Dec. 29, 2009, 3 pages.

Davis, Lidija, "*Introducing Microsoft's Gazelle: A Web Browser as a Multi-Principal OS*," Feb. 22, 2009, url: http://www.readwriteweb.com/archives/introducing_microsofts_gazelle.php, downloaded on Dec. 29, 2009.

Elliott, Matthew, "*gOS Cloud: browser-based OS for Netbooks*," Dec. 1, 2008, cnet.com, http://news.cnet.com/8301-17938_105-10110716-1.html, downloaded on Dec. 29, 2009, 1 page.

McCloud, Scott, and the Google Chome Team, "*Google Chrome*," url: http://www.google.com/googlebooks/chrome/, downloaded on Dec. 30, 2009, 20 pages.

Pichai, Sundar, "*A fresh take on the browser*," Official Google Blog, posted Sep. 1, 2008, url: http://googleblog.blogspot.com/2008/09/fresh-take-on-browser.html, downloaded on Dec. 29, 2009, 2 pages.

WikiPedia —The Free Encyclopedia, "*Android (Operating System)*," http://en.wikipedia.org/wiki/Android_operating_system, Downloaded on Dec. 30, 2009, 13 pages.

WikiPedia —The Free Encyclopedia, "*Cloud (Operating System)*," http://en.wikipedia.org/wiki/Cloud_operating_system, Downloaded on Dec. 30, 2009, 2 pages.

WikiPedia —The Free Encyclopedia, "*Gazelle (web browser)*," http://en.wikipedia.org/wiki/Gazelle_(web_browser), Downloaded on Dec. 30, 2009, 1 page.

WikiPedia —The Free Encyclopedia, "*Google Chrome OS*," http://en.wikipedia.org/wiki/Google_chrome_os, Downloaded on Dec. 30, 2009, 4 pages.

WikiPedia —The Free Encyclopedia, "*Google Chrome*," http://en.wikipedia.org/wiki/Google_chrome, Downloaded on Dec. 30, 2009, 9 pages.

WikiPedia —The Free Encyclopedia, "*Nexus One*," http://en.wikipedia.org/wiki/Nexus_One, Downloaded on Dec. 30, 2009, 2 pages.

WikiPedia —The Free Encyclopedia, "*Splashtop*," http://en.wikipedia.org/wiki/Splashtop, Downloaded on Dec. 30, 2009, 2 pages.

* cited by examiner

FLAT OR EXTENDED ARCHITECTURE USING AN INTEGRATED APPLICATION AND OPERATING SYSTEM COMPONENT FOR COMPUTING SYSTEMS AND ENVIRONMENTS

CROSS-RELATION TO RELATED APPLICATION

This application claims priority to provisional patent application Ser. No. 61/117,082, entitled "EXTENDED AND/OR ADJUSTABLE COMPUTING SYSTEMS USING ABSTRACT AND/OR CONCEALED COMPUTING SERVICE PROVIDERS," filed Nov. 21, 2008, provisional patent application Ser. No. 61/222,654, entitled "EXTENDING THE CAPABILITY OF COMPUTING DEVICES BY USING ABSTRACT AND DYNAMICALLY SCALABLE EXTERNAL RESOURCES," filed Jul. 2, 2009, provisional patent application Ser. No. 61/222,855, entitled "SECURING ELASTIC APPLICATIONS ON MOBILE DEVICES FOR CLOUD COMPUTING," filed Jul. 2, 2009, and provisional patent application Ser. No. 61/233,089, entitled "FLAT OR EXTENDED ARCHITECTURE USING AN INTEGRATED APPLICATION AND OPERATING SYSTEM COMPONENT FOR COMPUTING SYSTEMS AND ENVIRONMENTS," filed Aug. 11, 2009, which are all hereby incorporated herein by reference in their entirety and for all purposes.

BACKGROUND OF THE INVENTION

Conceptually, a computing system (e.g., a computing device, a personal computer, a laptop, a Smartphone, a mobile phone) can accept information (content or data) and manipulate it to obtain or determine a result based on a sequence of instructions (or a computer program) that effectively describes how to process the information. Typically, the information is stored in a computer readable medium in a binary form. More complex computing systems can store content including the computer program itself. A computer program may be invariable and/or built into, for example, a computer (or computing) device as logic circuitry provided on microprocessors or computer chips. Today, general purpose computers can have both kinds of programming. A computing system can also have a support system which, among other things, manages various resources (e.g., memory, peripheral devices) and services (e.g., basic functions such as opening files) and allows the resources to be shared among multiple programs. One such support system is generally known as an Operating System (OS), which provides programmers with an interface used to access these resources and services.

An Operating System (OS) can be an infrastructure software component of a computing system. As such, an OS can effectively manage and coordinate activities of a computing system, and facilitate sharing of the limited resources of the computer. An OS can act as a host for various computing application programs (or application programs) that are executed by the computing system. As a host, the OS, among other things, can handle the details of the lower level operations pertaining to the hardware. This effectively relieves application programs from having to manage details and makes it easier to develop application programs. Generally, computing devices, including handheld computers, desktop computers, supercomputers, video game consoles, use an operating system of some type. Functions provided by an OS can include: resource management (e.g., management and coordination of activities and the sharing of limited resources), scheduling (e.g., schedule resource accesses between hosted applications), abstraction (e.g., providing abstract device access via device drivers), and Inter-process Communication (IPC). In a traditional OS, (e.g., Windows Operating Systems, Linux Operating Systems) and OS "kernel" or (kernel) and system services can provides these functions to higher level applications programs. The application programs can access OS functions via system calls to the OS kernel and Application Programming Interfaces (API's) to system services.

Today, numerous types of computing devices are available. These computing devices widely range with respect to size, cost, amount of storage and processing power. The computing devices that are available today include: expensive and powerful servers, relatively cheaper Personal Computers (PC's) and laptops, and yet less expensive microprocessors (or computer chips) provided in storage devices, automobiles, and household electronic appliances.

In recent years, computing systems have become more portable and mobile. As a result, various mobile and handheld devices have been made available. By way of example, wireless phones, media players, Personal Digital Assistants (PDA's) are widely used today. Generally, a mobile or a handheld device (also known as handheld computer or simply handheld) can be a pocket-sized computing device, typically utilizing a small visual display screen for user output and a miniaturized keyboard for user input. In the case of a Personal Digital Assistant (PDA), the input and output can be combined into a touch-screen interface.

In particular, mobile communication devices (e.g., mobile phones) have become extremely popular. Some mobile communication devices (e.g., Smartphones) offer computing environments that are similar to that provided by a Personal Computer (PC). As such, a Smartphone can effectively provide a complete operating system as a standardized interface and platform for application developers. Given the popularity of mobile communication devices, telecommunication is discussed in greater detail below.

Generally, telecommunication refers to assisted transmission of signals over a distance for the purpose of communication. Conventional telephones have been in use for many years. Public switched telephone network (PSTN) is the network of the world's public circuit-switched telephone networks, in much the same way that the Internet is the network of the world's public IP-based packet-switched networks. Originally a network of fixed-line analog telephone systems, the PSTN is now almost entirely digital, and now includes mobile as well as fixed telephones. The PSTN is largely governed by technical standards created by the ITU-T, and uses E.163/E.164 addresses (known more commonly as telephone numbers) for addressing.

More recently, wireless networks have been developed. While the term wireless network may technically be used to refer to any type of network that is wireless, the term is often commonly used to refer to a telecommunications network whose interconnections between nodes is implemented without the use of wires, such as a computer network (which is a type of communications network). Wireless telecommunication networks can, for example, be implemented with some type of remote information transmission system that uses electromagnetic waves, such as radio waves, for the carrier and this implementation usually takes place at the physical level or "layer" of the network (e.g., the Physical Layer of the OSI Model). One type of wireless network is a WLAN or Wireless Local Area Network. Similar to other wireless devices, it uses radio waves instead of wires to transmit data back and forth between computers on the same network. Wi-Fi is a commonly used wireless network in computer systems allowing connection to the internet or other machines that have Wi-Fi functionalities. Wi-Fi networks broadcast radio waves that can be picked up by Wi-Fi receivers that are attached to different computers or mobile phones. A fixed wireless network is a type of wireless data network that can be used to connect two or more buildings together in order to extend or share the network bandwidth without physically wiring the buildings together.

Today, several mobile networks are in use. One example is the Global System for Mobile Communications (GSM) which is divided into three major systems which are the switching system, the base station system, and the operation and support system. A cell phone can connect to the base system station which then connects to the operation and support station; it can then connect to the switching station where the call is transferred to where it needs to go (Global System for Mobile Communication (GSM)). This is used for cellular phones as a common standard for a majority of cellular providers. Personal Communications Service (PCS) is a radio band that can be used by mobile phones in North America. Sprint happened to be the first service to set up a PCS. Digital Advanced Mobile Phone Service (D-AMPS) is an upgraded version of AMPS but it may be phased out as the newer GSM networks are replacing the older system.

Yet another example is the General Packet Radio Service (GPRS) which is a Mobile Data Service available to users of Global System for Mobile Communications (GSM) and IS-136 mobile phones. GPRS data transfer is typically charged per kilobyte of transferred data, while data communication via traditional circuit switching is billed per minute of connection time, independent of whether the user has actually transferred data or has been in an idle state. GPRS can be used for services such as Wireless Application Protocol (WAP) access, Short Message Service (SMS), Multimedia Messaging Service (MMS), and for Internet communication services such as email and World Wide Web access. 2G cellular systems combined with GPRS is often described as "2.5G", that is, a technology between the second (2G) and third (3G) generations of mobile telephony. It provides moderate speed data transfer, by using unused Time Division Multiple Access (TDMA) channels in, for example, the GSM system. Originally there was some thought to extend GPRS to cover other standards, but instead those networks are being converted to use the GSM standard, so that GSM is the only kind of network where GPRS is in use. GPRS is integrated into GSM Release 97 and newer releases. It was originally standardized by European Telecommunications Standards Institute (ETSI), but is now standardized by the 3rd Generation Partnership Project (3GPP). W-CDMA (Wideband Code Division Multiple Access) is a type of 3G cellular network. W-CDMA is the higher speed transmission protocol used in the Japanese FOMA system and in the UMTS system, a third generation follow-on to the 2G GSM networks deployed worldwide. More technically, W-CDMA is a wideband spread-spectrum mobile air interface that utilizes the direct sequence Code Division Multiple Access signaling method (or CDMA) to achieve higher speeds and support more users compared to the implementation of time division multiplexing used by 2G GSM networks. It should be noted that SMS can be supported by GSM and MMS can be supported by 2.5G/3G networks.

Generally, a mobile phone or cell phone can be a long-range, portable electronic device used for mobile communication. In addition to the standard voice function of a telephone, current mobile phones can support many additional services such as SMS for text messaging, email, packet switching for access to the Internet, and MMS for sending and receiving photos and video. Most current mobile phones connect to a cellular network of base stations (cell sites), which is in turn, interconnected to the public switched telephone network (PSTN) (one exception being satellite phones).

The Short Message Service (SMS), often called text messaging, is a means of sending short messages to and from mobile phones. SMS was originally defined as part of the GSM series of standards in 1985 as a means of sending messages of up to 160 characters, to and from Global System for Mobile communications (GSM) mobile handsets. Since then, support for the service has expanded to include alternative mobile standards such as ANSI CDMA networks and Digital AMPS, satellite and landline networks. Most SMS messages are mobile-to-mobile text messages, though the standard supports other types of broadcast messaging as well. The term SMS is frequently used in a non-technical sense to refer to the text messages themselves, particularly in non-English-speaking European countries where the GSM system is well-established.

Multimedia Messaging Service (MMS) is a relatively more modern standard for telephony messaging systems that allows sending messages that include multimedia objects (images, audio, video, rich text) and not just text as in Short Message Service (SMS). It can be deployed in cellular networks along with other messaging systems like SMS, Mobile Instant Messaging and Mobile E-mail. Its main standardization effort is done by 3GPP, 3GPP2, and Open Mobile Alliance (OMA).

Another more recent trend is the ever increasing accessibility of the Internet and the services that can be provided via the Internet. Today, the Internet can be accessed virtually anywhere by using various computing devices. For example, mobile phones, smart phones, datacards, handheld game consoles, cellular routers, and numerous other devices can allow users to connect to the Internet from anywhere in a cellular network. Within the limitations imposed by the small screen and other limited facilities of a pocket-sized or handheld device, the services of the Internet, including email and web browsing, may be available. Typically, users manage information with web browsers, but other software can allow them to interface with computer networks that are connected to or by the Internet. These other programs include, for example, electronic mail, online chat, file transfer and file sharing. Today's Internet can be viewed as a vast global network of interconnected computers, enabling users to share information along multiple channels. Typically, a computer that connects to the Internet can access information from a vast array of available servers and other computers by moving information from them to the computer's local memory. The Internet is a very useful and important resource as readily evidenced by its ever increasing popularity and widening usage and applications.

The popularity of computing systems is evidenced by their ever increasing use in everyday life. Accordingly, techniques that can improve computing systems would be very useful.

SUMMARY OF THE INVENTION

Broadly speaking, the invention relates to computing systems and computing environments. More particularly, the invention pertains to an architectural model for computing environments and computing systems. It will be appreciated that the architectural model can use integrated and/or flat (or extended) approaches that are especially suitable for designing software architectural layers.

In accordance with one aspect of the invention, an "integrated application and OS" component can effectively integrate at least one computer application program with one or more OS functions, in an integrated approach. The integrated application and OS component can be provided in or as an upper level system (or layer) in relation to a lower level system (or layer). The lower level system can include an OS operable to perform a reduced set of operating system functions not including one or more functions that can be performed by the integrated application and OS component of the upper layer. It will be appreciated that the OS can be a reduced, limited and/or lightweight OS (e.g., a micro kernel).

In accordance with another aspect of the invention, the OS may be specialized and/or optimized for the components of the upper level system including the integrated application and OS component. By way of example, the OS may be specialized and/or optimized for Web-based and/or Browser-based applications of the integrated application and OS component.

In accordance with yet another aspect of the invention, one or more components can be provided as adjacent components in an upper level of an architectural model in a flat (or extended) approach, thereby allowing effective extension of the upper level to accommodate various needs including, for example, the need for new hardware, or customization for a particular situation. It will be appreciated that an adjacent component can, for example, include one or more operating system components not provided by the OS (e.g., Device Drivers) and/or one or more functions that are not provided by the operating system (e.g., application management, security and/or isolation of applications). As another example, an adjacent component can effectively serve as an interface to another adjacent layer and/or the OS. As yet another example, an adjacent layer may also provide a Run Time Environment (RTE), or Virtual Computing Environment (VCE), or a Real-Time Operating System (RTOS) as multitasking OS for real-time applications.

It will be appreciated that integrated and/or flat (or extended) approaches of the invention can provide flexible and scalable environments, allowing development of applications for a relatively simple OS, thereby reducing the costs associated with application development and porting between different Operating Systems. It will also be appreciated that a flat (or extended) architectural model (or approach) is especially suited for Web-based applications, and in particular, Browser-based applications. As such, a Browser application can be integrated with one or more OS functions and provided in an upper level supported by a reduced OS optimized for browsing and Browser-based applications.

In accordance with one embodiment of the invention, a computing system can include a lower level system and an upper level system. The lower level system can include an operating system operable to perform a reduced set of operating system functions not including one or more first operating system functions that can be performed by an integrated system in the upper level system. The upper level system can include an integrated system integrating at least one computer application program with at least one User Interface (UI). The integrated system can be operable to perform first operating system functions that the OS is not operable to perform.

In accordance with another embodiment of the invention, a second system can be effectively provided as an adjacent system with respect to an integrated system. The second system includes one or more operating system components and/or one or more functions that are not provided by the OS. By way of example, the second system can include one or more Device Drivers, that can be accessed by a browser-based integrated system via an Abstract Hardware Interface (AHI) system provided as another adjacent system (a third system).

In addition, yet another adjacent layer can provide a Real-Time Operating System (RTOS) for supporting one or more real-time computer application programs.

The invention can be implemented in numerous ways, including, for example, a method, an apparatus, a computer readable (and/or storable) medium, and a computing system (e.g., a computing device). A computer readable medium can, for example, include at least executable computer program code stored in a tangible form. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
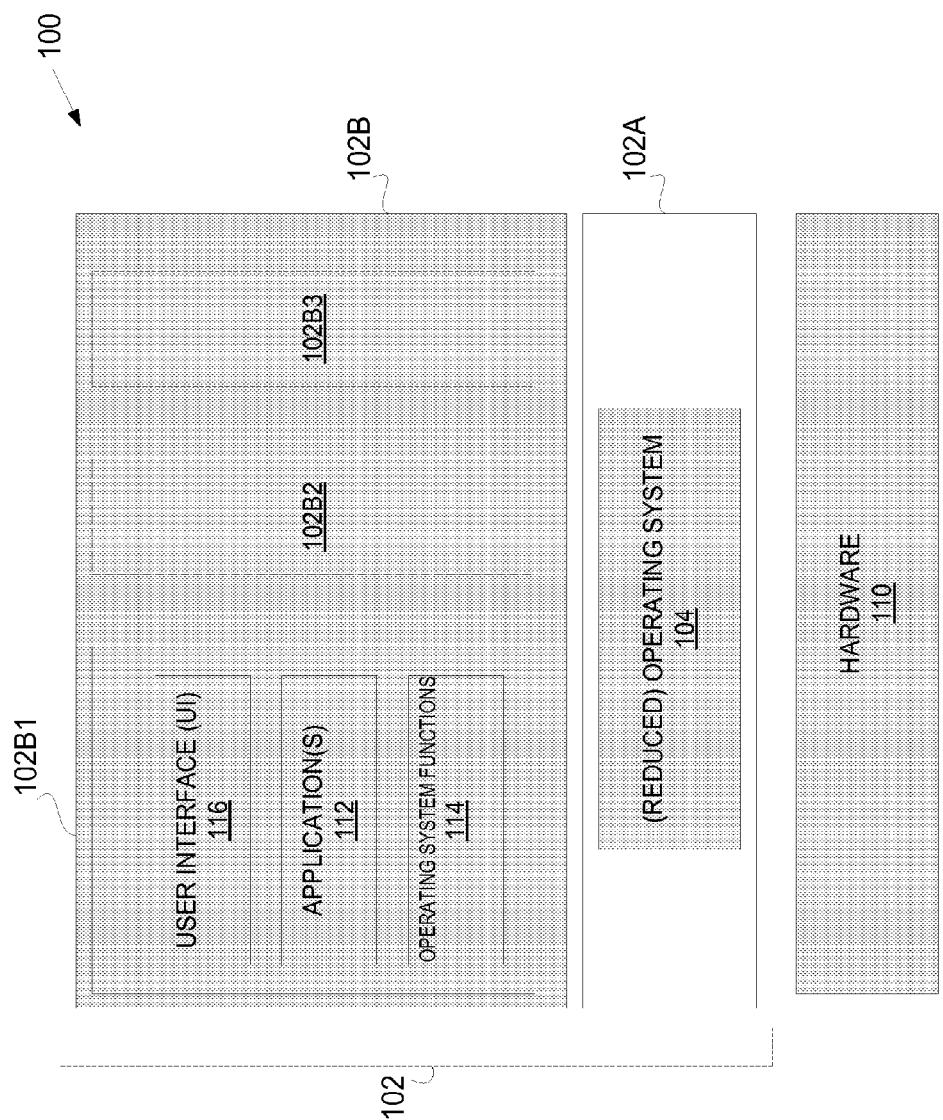
FIG. 1 depicts a computing environment in accordance with one embodiment of the invention.

As noted in the background section, computing environments and systems are very useful. Generally, a computing system can utilize an Operating System (OS). Conventionally, a rich or full OS with a full set of OS functions can be provided to support computer application programs (or applications). In a traditional top-down architectural model, the OS is in a lower software layer (or OS layer) supporting applications in an upper (or higher) software layer (Application Layer). The upper (or Application) and lower (or OS) software layers are well defined with respect to the functions they provide so that the applications in the application layer do not provide OS functions but can rely on a rich or full OS in the application layer to provide various OS functions including: resource management (e.g., management and coordination of activities and the sharing of limited resources), scheduling (e.g., schedule resource accesses between hosted applications), abstraction (e.g., providing abstract device access via device drivers), and Inter-Process Communication (IPC). Conventionally, an OS "kernel" (or kernel) and/or system services can provide these functions to higher level applications programs. The application programs can access OS functions via system calls to the OS kernel and Application Programming Interfaces (API's) to system services. In addition, various operating system components (e.g., device drivers) are typically integrated with an OS and/or provided in an operating system layer that can be effectively isolated from the applications. Examples of generally well know Operating Systems include, Windows Operating Systems and Linux Operating Systems.

It will be appreciated that providing a rich or full OS may not be desirable or feasible for some computing systems, especially those operating with limited resources (e.g., limited processing power and/or limited memory). Also, development of application programs for various operating systems and porting them from one OS to another OS can be costly and problematic. Moreover, a rich or full OS of a conventional computing system may not be an ideal solution for providing Web-based applications and especially browser-based applications. More generally, a traditional top-down architectural model may not be well suited for future development of application programs and computing devices, especially for development of web-based application for mobile and Consumer Electronic (CE).

The invention pertains to an architectural model for computing environments and computing systems. It will be appreciated that the architectural model can use integrated and/or flat (or extended) approaches that are especially suitable for designing software architectural layers.

In accordance with one aspect of the invention, an "integrated application and OS" component can effectively integrate at least one computer application program with one or more OS functions, in an integrated approach. The integrated application and OS component can be provided in or as an upper level system (or layer) in relation to a lower level system (or layer). The lower level system can include an OS operable to perform a reduced set of operating system functions not including one or more functions that can be performed by the integrated application and OS component of the upper layer. It will be appreciated that the OS can be a reduced, limited and/or lightweight OS (e.g., a micro kernel).

In accordance with another aspect of the invention, the OS may be specialized and/or optimized for the components of the upper level system including the integrated application and OS component. By way of example, the OS may be specialized and/or optimized for Web-based and/or Browser-based applications of the integrated application and OS component.

In accordance with yet another aspect of the invention, one or more components can be provided as adjacent components in an upper level of an architectural model in a flat (or extended) approach, thereby allowing effective extension of the upper level to accommodate various needs including, for example, the need for new hardware, or customization for a particular situation. It will be appreciated that an adjacent component can, for example, include one or more operating system components not provided by the OS (e.g., Device Drivers) and/or one or more functions that are not provided by the operating system (e.g., application management, security and/or isolation of applications). As another example, an adjacent component can effectively serve as an interface to another adjacent layer and/or the OS. As yet another example, an adjacent layer may also provide a Run Time Environment (RTE), or Virtual Computing Environment (VCE), or a Real-Time Operating System (RTOS) as multitasking OS for real-time applications.

It will be appreciated that integrated and/or flat (or extended) approaches of the invention can provide flexible and scalable environments, allowing development of applications for a relatively simple OS, thereby reducing the costs associated with application development and porting between different Operating Systems. It will also be appreciated that a flat (or extended) architectural model (or approach) is especially suited for Web-based applications, and in particular, Browser-based applications. As such, a Browser application can be integrated with one or more OS functions and provided in an upper level supported by a reduced OS optimized for browsing and Browser-based applications.

In accordance with one embodiment of the invention, a computing system can include a lower level system and an upper level system. The lower level system can include an operating system operable to perform a reduced set of operating system functions not including one or more first operating system functions that can be performed by an integrated system in the upper level system. The upper level system can include an integrated system integrating at least one computer application program with at least one User Interface (UI). The integrated system can be operable to perform first operating system functions that the OS is not operable to perform.

In accordance with another embodiment of the invention, a second system can be effectively provided as an adjacent system with respect to an integrated system. The second system includes one or more operating system components and/or one or more functions that are not provided by the OS. By way of example, the second system can include one or more Device Drivers, that can be accessed by a browser-based integrated system via an Abstract Hardware Interface (AHI) system provided as another adjacent system (a third system). In addition, yet another adjacent layer can provide a Real-Time Operating System (RTOS) for supporting one or more other real-time computer application programs that may not be supported by the OS or may not be part of the Integrated system.

Embodiments of these aspects of the invention are discussed below with reference to FIGS. 1-4. However, those skilled in the art will readily appreciate that the detailed description given herein with respect to these figures is for explanatory purposes as the invention extends beyond these limited embodiments.

FIG. 1 depicts a computing environment 100 in accordance with one embodiment of the invention. The computing environment 100 can represent an integrated (or flat) architecture (e.g., a software architecture, a system architecture) 102 with two levels, layers, or systems (e.g., software layers, or systems) 102A and 102B. It will be appreciated that unlike conventional software architectural models, the top layer 102B need not be provided with discrete functions with respect to the lower layer 102A. In other words, in accordance with an integrated approach of the architecture model 102, one or more functions that are conventionally performed by a lower layer, such as, for example, a software layer 102A, can be provided by an upper software layer, such as, for example, a software layer 102B. In addition, the architecture 102 can effectively use a "flat" or "extended" approach rather than a conventional top-down approach.

To further elaborate, an integrated (or flat) architectural model 102 will be described in context of an exemplary software architecture model. Firstly, it should be noted that in an integrated approach of the architecture model 102, components and/or functions conventionally provided by the lower layer 102A can be effectively moved to the upper layer 102B. Secondly, in a flat (or extended) approach, the components and/or functions (e.g., operating system functions, device drives conventionally incorporated in the operating system) can be provided as two or more adjacent layers. Generally, the second software layer 102B can include as many adjacent layers as may be needed and/or desired. It should also be noted that the second software layer 102B can be effectively supported by the first software layer 102 which can be effectively built over a Hardware (or Hardware Layer) 110. It will be appreciated that the first software layer 102 can effectively replace a conventional Operating System (OS) layer. As such, the computing environment 100 can, for example, be provided as a computing system and/or by a computing system (e.g., computing device).

Referring to FIG. 1, as a software layer, the first layer 102A can include an Operating System (OS) 104. More particularly, the OS 104 can be provided as a Reduced Operating System (ROS) 104. Those skilled in the art will appreciate that a ROS 104 can, for example, be provided as a limited and/or lightweight OS (e.g., a micro kernel). In other words, the ROS 104 can lack some of the operating system capabilities or operating system functions conventionally provided by a traditional OS (e.g., conventional Linux, Unix, or Windows Operating Systems). In this respect, the ROS 104 may be considered to be a reduced, or a limited version of a "full" or "rich" conventional OS. Furthermore, it will be appreciated that the ROS 102A may be specialized and/or optimized for the second layer 102B. As such, ROS 102A can, for example, be provided as a limited, lightweight and/or specialized micro kernel provided specifically for supporting a second software layer 102B.

As shown in FIG. 1, as a software layer, the second layer 102B can include an integrated system 102B1. Generally, the integrated system 102B1 can integrate functionalities that are traditionally assigned to the lower layer 102A (e.g., operating system functions) with those that are traditionally assigned to the upper layer 102B (e.g., Application Program functions, User Interface functions). By way of example, the integrated system 102B1 can be provided as an Integrated Operating, Application, and User Interface (IOAUI) component (or system) 102B1. Unlike a conventional computer Application Program Layer (or Application layer), an IOAUI component 102B1 can effectively integrate an Application Program 112 with one or more operating system functions (or capabilities) 114 conventionally provided by an Operating System. In addition, IOAUI component 102B1 can effectively integrate a User Interface (UI) 116 with an Application Program 112 and operating system capabilities 114. The UI 116 can be operable to allow a user to access the Application Program 112 and effectively use the computing services made available by the computing environment 100. Referring to FIG. 1, IOAUI component 102B1 can be provided as an integrated package of a UI 116, one or more Application Programs 112, and one or more Operating System (OS) functions 114 ($OS_{f1}, \ldots, OS_{fn}$, where n is greater or equal to one). It should be noted that the IOAUI component 102B1 can be provided as a User Interface (or interface-based) Application Program that combines or integrates an Application Program with a User Interface. By way of example, the IOAUI component 102B1 can include a Web browser computer application program (or a Web browser as generally known in the art) and one or more OS functions or capabilities 114.

The Operating System (OS) functions 114 can, for example, include one or more of the following: application management, high-level application management, application isolation and/or security management, process management, high-level process management, scheduling operations, high-level scheduling operations, interrupt handling, and high-level interrupt handling. As such, as a reduced or limited operating system, a ROS 104 may be operable to provide only a limited set of operating system functions. By way of example, the ROS 104 may be operable only to perform memory management and Inter-Process Communication (IPC). As another example, a ROS 104 may be operable only to perform memory management, Inter-Process Communication (IPC), scheduling and interrupt handling. An additional OS functions needed can be provided in the upper level 102B as may be needed by the integrated system 102B1, or as one or more adjacent system 102B2 and 102B3.

As shown in FIG. 1, a component 102B2 can be provided as an adjacent layer (or component) to the integrated layer 102B1. For example, an adjacent software layer 102B2 can provide OS functions or components conventionally provided by an OS. In other words, an adjacent software layer 102B2 can provide OS capabilities and/or components that are not provided by a ROS 104. These operating system functions (or capabilities) and/or components may or may not be provided by the integrated layer 102B1. By way of example, an adjacent software layer 102B2 can provide Device Drivers (DDs) for various hardware devices of a hardware layer 110, as will be known to those skilled in the art. Conventionally, these Device Drivers (DDs) are provided as a part of the OS (e.g., as a part of a Kernel). However, it will be appreciated that Device Drivers (DDs) can be effectively removed from the OS and provided as one or more adjacent software layers 102B2 in connection with an integrated software layer 102B1.

Additionally, one or more other adjacent software layers 102B3 can be provided in the second software layer 102B. By way of example, an adjacent software layer 102B3 may be provided to allow accessing and/or interfacing with another adjacent software layer in the upper layer 102B (e.g., a Hardware Abstract Layer (HAL) for accessing an adjacent Device Driver layer). As another example, an adjacent software layer 102B3 may provide a Real-Time Operating System (RTOS) to support real-time applications.

It will be appreciated that the architectural model 102, among other things, allows providing a relatively simple OS, thereby reducing or eliminating the cost associated with having to port applications from one conventional OS to another conventional OS. This approach allows development of Application Programs without having to change the OS, thereby enhancing application program development and maintenance.

Figure 2:
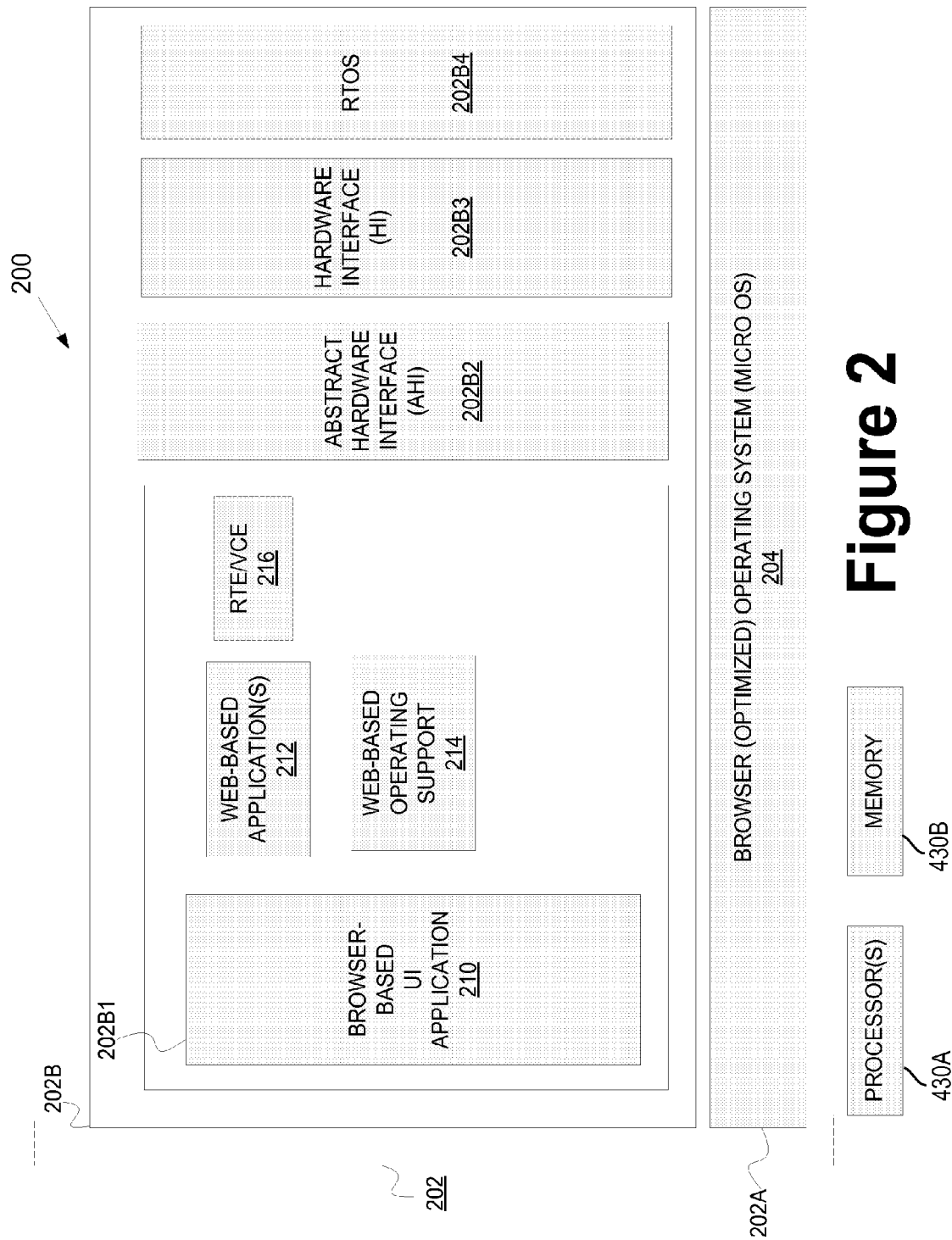
FIG. 2 depicts a Web-based computing environment in accordance with one embodiment of the invention.

It will also be appreciated that the architectural model 102 is especially suited for Web-based computing environments and Web-based applications. To further elaborate, FIG. 2 depicts a Web-based computing environment and/or system 200 in accordance with one embodiment of the invention. Referring to FIG. 2, a flat software architectural layer 202 is depicted with a lower software layer 202A and an upper software layer 202B. The lower software layer 202A can provide a Reduced Operating System (ROS) 204 specialized and/or optimized for Web-based application. As such, those skilled in the art will appreciate that the ROS 204 can, for example, be provided as a browser-optimized micro-kernel (β) for a browser-based integrated layer 202B1. As shown in FIG. 2, the browser-based integrated layer 202B1 can include a Browser User Interface Application (BUIA) 210 (e.g., a conventional web browser application), one or more web-based applications 212 (e.g., a general web-based application, a browser-based phone application), and Web-based operating (or operational) support component (or system) 214. Generally, the Web-based operating component 214 can provide OS functionalities pertaining to web-based applications conventionally provided by an OS. By way of example, the Web-based operating support component 214 can provide high-level management functions for managing web-based applications 212. In addition, the Web-based operating support component 214 may be operable to perform other operating systems functions including the OS functions noted above with respect to the integrated system 102B depicted in FIG. 1, including: application isolation, security management, process management, scheduling operations, and interrupt handling.

As will be appreciated by those skilled in the art, the browser-based integrated layer 202B1 can be effectively supported by a Run Time Environment (RTE), or a Virtual Computing Environment (VCE) 216. By way of example, a Virtual Machine (VM) 216 can effectively support execution of one or more web-based applications 212.

Referring to FIG. 2, an Abstract Hardware (or Device) Interface (AHI) component (or system) 202B2, and a Hardware (or Device) Interface (HI) 202B3 are provided as adjacent layers in the upper level 202B. The Hardware Interface (HI) 202B3 represents one or more hardware interfaces that are conventionally integrated in an OS and/or effectively provided by an OS (e.g., one or more device drivers conventionally provided in a kernel). It will be appreciated that the AHI component 202B2 can serve as an interface to the browser-based integrated layer 202B1. In other words, the browser-based integrated layer 202B1 can use the AHI component 202B2 as an interface for accessing the HI 202B3. As such, the AHI component 202B2 can, for example, be provided as, or similar to, a Hardware Abstraction Layer (HAL) that may include graphics, Input/Output (I/O), and/or a file system. As generally known in the art, a conventional Hardware Abstraction Layer (HAL) can serve as an abstraction layer, implemented in software, between physical hardware of a computer and the software that runs on that computer. HAL can function to hide differences in hardware from most of the operating system kernel, so that most of the kernel-mode code does not need to be changed to run on systems with different hardware.

It should be noted that the ROS 204 can be operable to provide only basic conventional operating system capabilities, such as, Inter-Process Communication (IPC) and memory management (e.g., memory allocation). However, the ROS 204 can be operable to provide specialized or specific functions for Web-based environments. By way of example, an ROS 204 can be specialized and/or optimized for multi-tasking to allow a browser UI application 210 to load multiple Webpages. As another example, an ROS 204 can provide security functions operable to isolate and/or protect Web-based applications 212 from each other.

Figure 3:
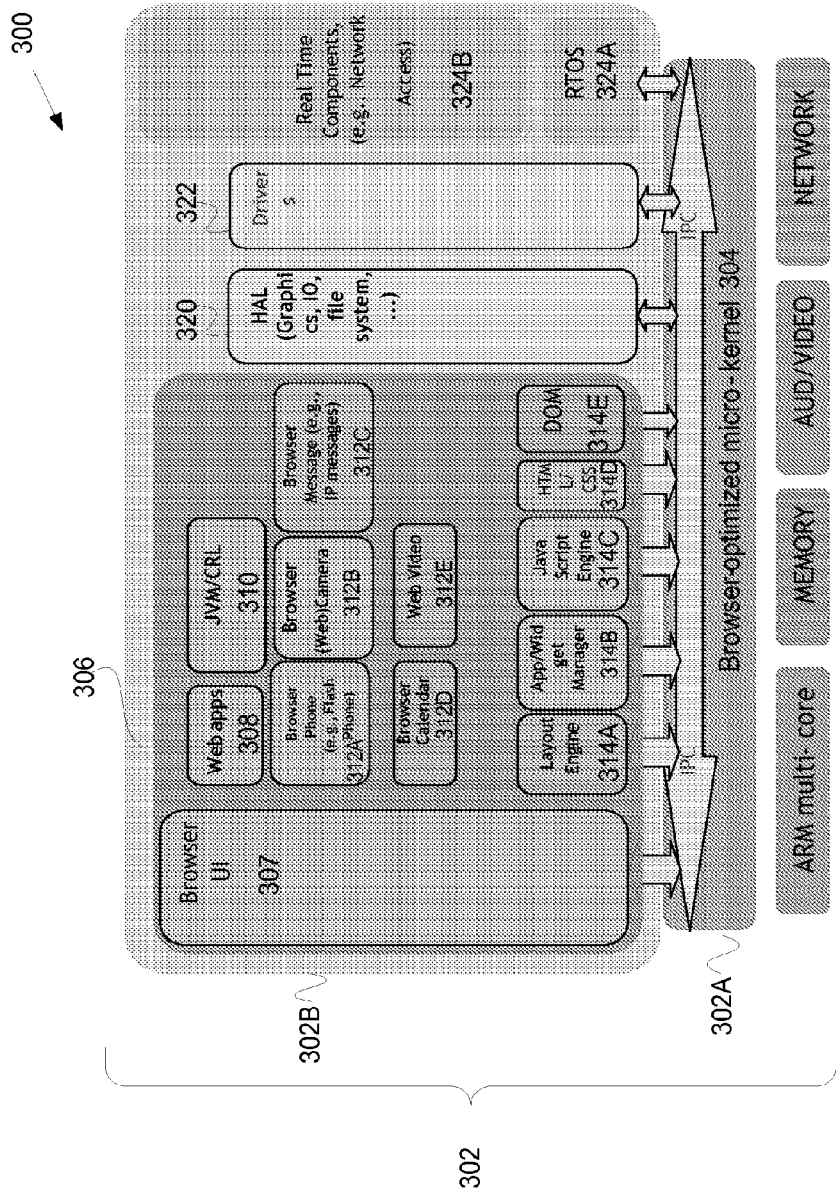
FIG. 3 depicts a computing device in accordance with one embodiment of the invention.

FIG. 3 depicts a computing device 300 in accordance with one embodiment of the invention. It will be appreciated that device 300 can, for example, be provided as a mobile device (e.g., a mobile phone, a smartphone) operable for Web-based and Browser-based applications. Referring to FIG. 3, the computing device 300 effectively utilizes a flat (or extended) software architecture model 302 with a lower software layer 302A and an upper software layer 302B. As shown in FIG. 3, the lower software layer 302A can be provided as a Browser-optimized micro-kernel (β) 304. The Browser-optimized micro-kernel (β) 304 can be specialized and/or optimized for a browser-based integrated layer 306 operating in the upper software layer 302B. Those skilled in the art will appreciate that in addition to a browser User Interface (UI) (browser application) 307, one or more Web applications 308, a Java Virtual Machine (JVM) and/or a Common Language Runtime (CLR) components 310, the browser-based integrated layer 306 can also include a variety of Browser-based applications, as exemplified by a browser phone (e.g., a Flash phone) component 312A, a Browser (or Web) camera component 312B, a Browser message component 312C, browser calendar 312D, and a web video 312E. In addition, various operations including web-based operations can be performed by the browser-based integrated layer 306, as exemplified by: a Webpage Layout Engine (WLE) component 314A, an Application/Widget Manager (AWM) component 314B, a Java Script Engine (JSC) 314C, HyperText Markup Language (HTML)/Cascading Style Sheets Specification (CSS) Component 314D, and a Document Object Model (DOM) component 314E, which will be appreciated by those skilled in the art.

Referring to FIG. 3, Hardware Abstraction Layer (HAL) 320 and Device Driver (DD) Layer 322 are provided as adjacent layers in the upper layer 302b in the flat (or extended) software architecture 302. It should be noted that the browser-based integrated layer 306 is operable to use (or interface with) the HAL 320 to access one or more hardware device drivers of the Device Driver (DD) Layer 322 (e.g., an Audio/Video hardware component, or a Networking component). In addition, a RTOS 324A is provided in another adjacent software layer 324 of the upper software layer 302B. The (RTOS) 324A can be operable to support real-time components 324B (e.g., real time network access)

Those skilled in the art will appreciate that flat (or extended) software architecture 302 allows effective splitting and/or partitioning of OS functions needed for execution of browser-based applications between the lower and upper software layers 302A and 302B. The OS function can be provided by one or more components of the Browser-based integrated application 306, the Browser-optimized micro-kernel (β) 304, or more or other adjacent components (e.g., component 322), layer or sub-layers.

Those skilled in the art will also appreciate that the architecture 302 allows providing rich browser functions, servicing Rich Internet Applications (RIA's), as well as, providing interfaces for application development of RIA and phone related applications. More particularly, a uniform interface for Browser-based applications can be provided to interact with a Browser-optimized micro-kernel (β) 304, abstracting hardware and network resources, thereby simplifying development of Browser-based applications. Unlike conventional environments, in a flat software architecture 302, the web applications need not be limited to accessing platform resources (e.g., limited to accessing a dedicated directory of a local files system, or accessing Web sites based on the same-origin principle). A uniform interface for browser-based applications, also allows effectively extending the life cycle of the applications and widgets.

It should also be noted that a Browser-based integrated layer (e.g, Browser-based integrated layer 306) need not be provided for a particular hardware. In other words, the Browser-based integrated layer 306 may initially be provided as a general purpose Browser-based component. However, a flat (or extended) software architecture 302 can be scalable and flexible to allow supporting specific or new hardware and/or applications as may be needed by allowing adjacent components (or layers) to be added. By way of example, when new hardware is to be provided, the device driver(s) for the new hardware can be provided as an adjacent layer 322, thereby seamlessly supporting new hardware (e.g., device drivers can be loaded into a dedicated device driver layer, or domain Virtual Machine). This flexibility and scalability provides "plug-and-play" capabilities. In addition, new Web-based applications and services can be developed to fully leverage a Browser-based integrated layer 306 using simple and uniform interfaces provided to access various hardware resources and network connections that are available today, as well as those that may be developed in the future.

A Browser-based integrated layer 306 provided for a relatively simple, limited, or reduced OS (or micro OS) 304 can reduce the complexity of software development, especially for Consumer Electronic (CE) devices that tend to operate with limited resources (e.g., processing power, memory). As such, there is no need to provide a rich (or full) OS with redundant functionality, especially for Browser-based applications.

Figure 4:
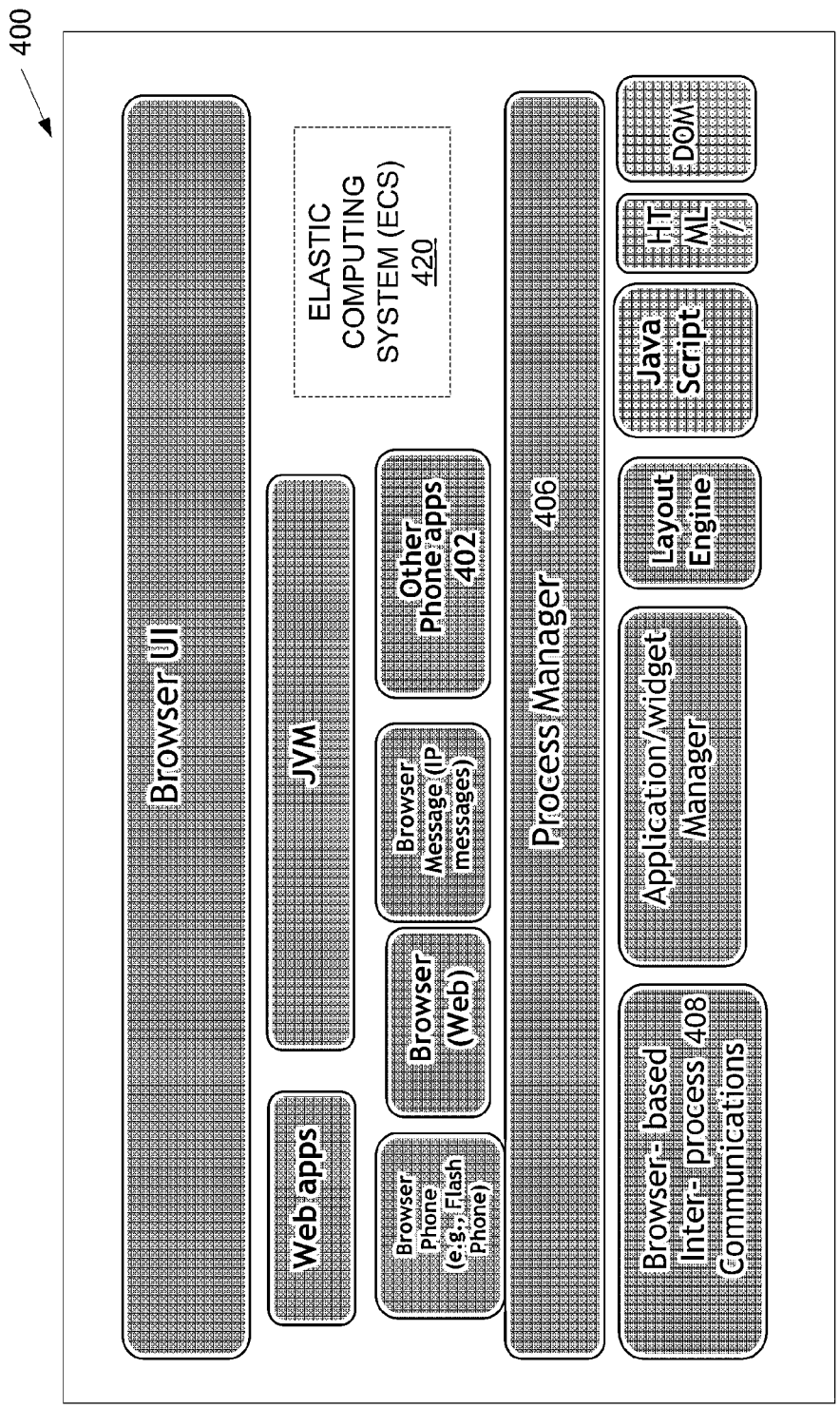
FIG. 4 depicts an exemplary Browser-based integrated layer in accordance with one embodiment of the invention.

FIG. 4 depicts an exemplary Browser-based integrated layer 400 in accordance with another embodiment of the invention. It will be appreciated that the Browser-based integrated layer 400 is especially suited for mobile computing and/or communication devices (e.g., a Smart phone, a mobile phone).

Referring to FIG. 4, the browser-based integrated layer 400 can provide similar components as the browser-based integrated component 306 depicted in FIG. 3. However, the browser-based integrated layer 400 can also include additional phone applications 402 developed for a Browser-optimized micro-kernel (β) (not shown). Moreover, the browser-based integrated layer 400 can provide a process management component 406 and a browser-based Inter-Process Communication (IPC) component 408. The process management component 406 can perform process management operations for various Web-based, browser-based and/or phone-based applications of the browser-based integrated layer 400. Such process management operations are conventionally performed by an OS. Similarly, the Browser-based Inter-Process Communication (IPC) component 408 can perform Inter-Process Communication (IPC) between processes of various for various Web-based, browser-based and/or phone-based applications of the browser-based integrated layer 400.

It should be noted that a Browser-based integrated layer 400 may also include an Elastic Computing System (ECS) 420 operable to effectively use the external computing resources (e.g., processing power 430A, memory 430B) of an abstract and/or concealed computing component which can, for example, be an Abstract and Dynamically Scalable Computing Resource (ADSCR), as will be known to those skilled in the art. An ADSCR can, for example, be a "Cloud" computing resource. The ECS 420 can include a plurality of components and can be operable to effectively extend the internal computing resources of a computing device by utilizing the computing resources of the abstract and/or concealed computing component. The ECS 420 can, for example, be provided in accordance with the techniques described in the U.S. patent application Ser. No. 12/559,394 (SISAP072), entitled: "EXTENDING THE CAPABILITY OF COMPUTING DEVICES BY USING DYNAMICALLY SCALABLE EXTERNAL RESOURCES," which is hereby incorporated by reference herein in its entirety and for all purposes.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computing system, comprising:
   a memory device;
   a lower level system including an operating system operable to perform a reduced set of operating system functions not including one or more first operating system functions; and
   an upper level system with respect to said lower level system, wherein said upper level system comprises:
   an integrated system integrating at least one computer application program with at least one user interface, wherein said integrated system is operable to:
      perform said one or more first operating system functions that said operating system is not operable to perform; and
      access said operating system to request at least one of said reduced set of operating system functions, whereby said operating system of said lower level system supports at least said integrated system of said upper level system; and
   an interface system adjacent to said integrated system, wherein said interface system comprises an Abstract Hardware Interface (AHI) system operable to interface with said operating system and access one or more device drivers for one or more devices via said operating system;
   wherein said operating system is operable to perform only memory management and Inter-Process Communication (IPC) between said integrated system and said AHI system; and
   wherein said integrated system is operable to access said AHI system via said operating system, thereby allowing said integrated system to access said one or more device drivers through said AHI system without addressing said one or more device drivers directly.

2. The computing system of claim 1, wherein said upper level system further comprises:
   a second system provided as an adjacent system with respect to said integrated system, wherein said second system includes one or more operating system components not provided by said operating system or one or more functions not provided by said operating system.

3. The computing system of claim 2, wherein said operating system components not provided by said operating system includes said one or more device drivers.

4. The computing system of claim 1, wherein said upper level system further includes:
   a third system provided as an adjacent system with respect to said integrated system, wherein said third system is operable to provide a real-time operating system.

5. The computing system of claim 4, wherein said third system is operable to perform said one or more first operating system functions not provided by said operating system.

6. The computing system of claim 4, wherein said integrated system is operable to perform one or more of the following:
   application management, high-level application management, application isolation, security management, process management, high-level process management, scheduling operations, and interrupt handling.

7. The computing system of claim 1, wherein said computing system further includes:
   said one or more devices, wherein said one or more devices are accessible by said operating system;
   wherein said one or more device drivers are not part of said operating system but are provided as part of said upper level system, and wherein said one or more device drivers are operable to respectively interface with said one or more devices via said operating system.

8. The computing system of claim 7, wherein said interface system comprises:
   an Abstract Hardware Interface (AHI) system operable to provide an interface to access said one or more device drivers via said operating system.

9. The computing system of claim 1, wherein said operating system is operable to perform only memory management, Inter-Process Communication (IPC), scheduling and interrupt handling.

10. The computing system of claim 1, wherein said reduced set of operating system functions comprise memory management and Inter-Process Communication (IPC).

11. The computing system of claim 1, wherein said one or more first operating system functions that are performed by said integrated system instead of said operating system include one or more of the following:
- application management operations, scheduling operations, and resource management operations, and process management operations.

12. The computing system of claim 1, wherein said integrated system includes an Elastic Computing System (ESC) operable to use one or more computing resources of at least one external computing resource in order to extend one or more internal computing resources of said computing system.

13. The computing system of claim 12,
- wherein said at least one external computing resource includes a dynamically scalable computing resource operable to provide one or more external computing resources or services as needed; and
- wherein said ESC is further operable to use said at least one external computing resource and said one or more internal computing resources to execute executable computer code.

14. The computing system of claim 12, wherein said at least one external computing resource includes an Abstract and Dynamically Scalable Computing Resource (ADSCR).

15. The computing system of claim 14,
- wherein said ADSCR is a "Cloud" computing resource operable to deliver one or more web-based services over an Internet; and
- wherein said integrated system includes a Web browser operable as an interface to said one or more web-based services.

16. The computing system of claim 1, wherein said integrated system includes a Web browser operable as an interface to access one or more web-based services delivered via Internet.

17. The computing system of claim 1, wherein said integrated system includes one or more domains or one or more Virtual Computing Environments (VCEs) supported by said operating system.

18. The computing system of claim 1,
- wherein said integrated system includes one or more Virtual Machines (VMs); and
- wherein said operating system includes a Virtual Machine Monitor (VMM) operable to monitor said one or more VMs.

19. The computing system of claim 1, wherein said integrated system includes one or more web-based applications and a Web browser application operable to provide an interactive interface to web-based content of the World Wide Web via Internet.

20. The computing system of claim 1, wherein said computing system further comprises:
- a Real-Time Operating System (RTOS) operable to support one or more real-time computer application programs.

21. The computing system of claim 1, wherein said at least one computer application program is a browser computer application program operable to enable a user to interface with content.

22. The computing system of claim 21, wherein said at least one computer application program is a Web browser operable to enable a user to interact with web-based content over Internet.

23. The computing system of claim 22, wherein said Web browser is operable to run multiple Webpages and load multiple Web applications; and
- wherein said Web browser is operable to isolate said multiple Webpages from each other to provide a secure environment.

24. A non-transitory computer readable storage medium storing at least executable computer code for an upper level system operable to interface with a lower level system, wherein said lower level system includes an operating system operable to perform a reduced set of operating system functions not including one or more first operating system functions, wherein said computer readable storage medium includes:
- the at least executable computer code for the upper level system comprising:
  - first executable computer code for an integrated system integrating executable computer code for at least one computer application program with at least one user interface, and wherein said first executable computer code includes:
    - executable computer code operable to perform said one or more first operating system functions that said operating system is not operable to perform; and
    - executable computer code operable to access said operating system to request at least one of said reduced set of operating system functions; and
  - second executable computer code for an interface system adjacent to said integrated system, wherein said interface system comprises an Abstract Hardware Interface (AHI) system operable to interface with said operating system and access one or more device drivers for one or more devices via said operating system;
- wherein said operating system is operable to perform only memory management and Inter-Process Communication (IPC) between said integrated system and said AHI system; and
- wherein said integrated system is operable to access said AHI system via said operating system, thereby allowing said integrated system to access said one or more device drivers through said AHI system without addressing said one or more device drivers directly.

25. The non-transitory computer readable storage medium of claim 24, wherein said computer readable storage medium further includes:
- third executable computer code for said operating system operable to perform said reduced set of operating system functions; and
- said one or more device drivers.

* * * * *